United States Patent [19]

Brömer

[11] 4,126,068

[45] Nov. 21, 1978

[54] NUMERICALLY CONTROLLED NIBBLING MACHINE

[75] Inventor: Günter Brömer, Spardorf, Fed. Rep. of Germany

[73] Assignee: Siemens Aktiengesellschaft, Berlin and Munich, Fed. Rep. of Germany

[21] Appl. No.: 807,731

[22] Filed: Jun. 17, 1977

[30] Foreign Application Priority Data

Jun. 28, 1976 [DE] Fed. Rep. of Germany ....... 2628963

[51] Int. Cl.$^2$ .......................... B23D 27/00; B26D 5/20
[52] U.S. Cl. ........................................... 83/237; 83/49; 83/916; 83/72; 83/241
[58] Field of Search ...................... 83/209, 49, 71, 72, 83/237, 240, 241, 414, 916

[56] References Cited

U.S. PATENT DOCUMENTS

| 3,563,123 | 2/1971 | Leibinger | 83/237 |
| 3,664,217 | 5/1972 | Schiewek et al. | 83/71 |
| 4,023,788 | 5/1977 | Herb et al. | 83/209 |

*Primary Examiner*—Donald R. Schran
*Attorney, Agent, or Firm*—Kenyon & Kenyon, Reilly, Carr & Chapin

[57] ABSTRACT

A numerically controlled nibbling machine in which the feed distance of a workpiece is limited by a release time during which a work tool is disengaged from the workpiece according to a predetermined number of strokes of the work tool per unit of time. The nibbling machine includes drive means for the work tool, means for controlling the feed rate of the workpiece with respect to the work tool, means for determining the release time in a single stroke of the work tool for every number of strokes of the tool per unit of time, and means for automatically determining minimum acceleration and deceleration of the workpiece required for travelling the feed distance and for forming a desired feed rate value for the workpiece from the release time and the feed distance of the workpiece. The improvement of the invention comprises the means for determining the release time further comprising switch means disposed in the path of the work tool for generating a stop command signal for the drive means for the work tool. The determining means further comprises means for selectively transmitting the stop command signal from the switch means to the control means when a predetermined, lowest speed of the drive means for the work tool is reached and stopping the work tool at an upper dead-center position of the work tool in the nibbling machine.

1 Claim, 1 Drawing Figure

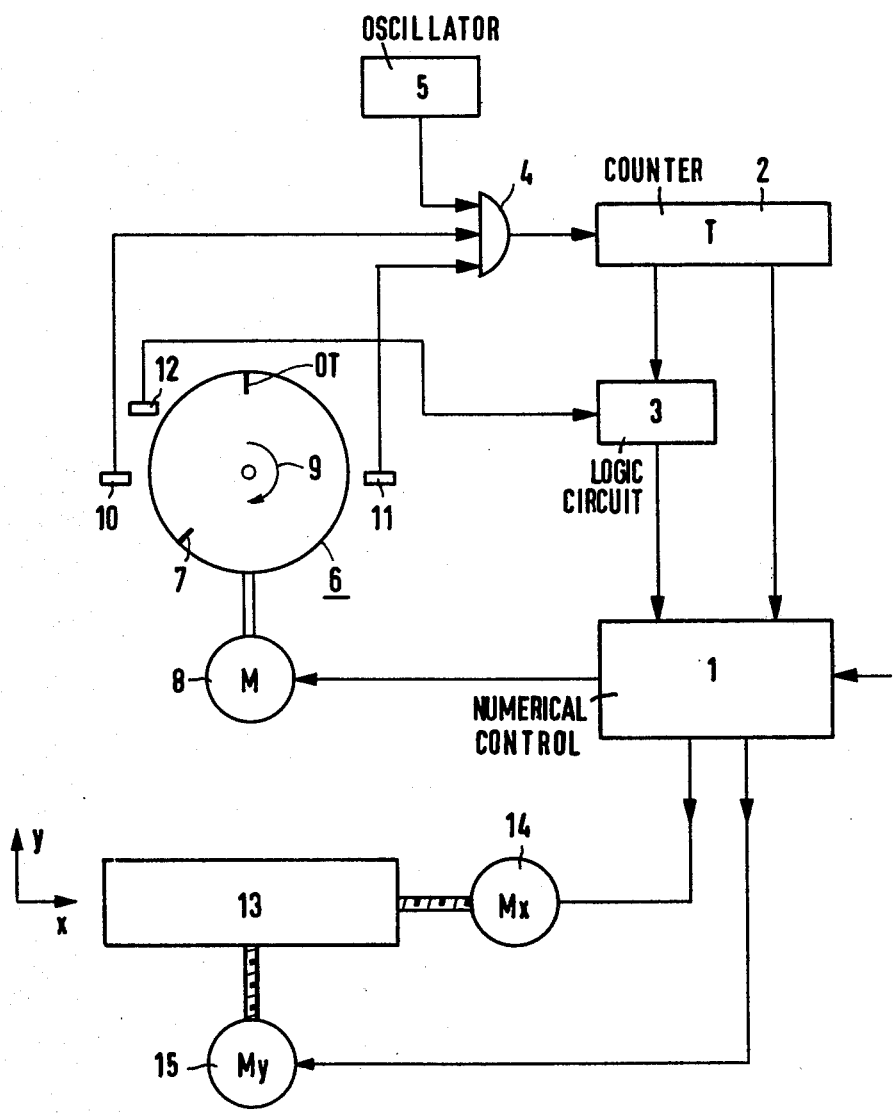

4,126,068

NUMERICALLY CONTROLLED NIBBLING MACHINE

BACKGROUND OF THE INVENTION

1. Field of the Invention

The present invention relates to an improved numerically controlled nibbling machine in which the feed distance of a workpiece is limited by a release time during which a work tool is disengaged from the workpiece according to a predetermined number of strokes of the work tool per unit of time, i.e., the speed of rotation of the ram shaft.

2. Description of the Prior Art

Numerically controlled nibbling machines of the foregoing type are known in the art. See, for example, Siemens - Zeitschrift 1970 and 1973, specifically, the respective Supplements on Numerical Control, pages 74–79 and 70–71, respectively. Such nibbling machines are extensively used at present for the working of sheet metal. During continuous nibbling, the workpiece feed mechanism is released during every stroke by means of end switches disposed in the path of the ram of the nibbling machine, specifically during the time during which the work tool is disengaged from the workpiece. Such nibbling machines operate at speeds of up to 400 strokes per minute and at relatively small clearances of the work tool of a few millimeters. Consequently, feeding of the workpiece is possible only during a very short period of time.

In present controls for such nibbling machines, the feed rate of the workpiece is predetermined by a programmer, and the feed distance travelled per stroke of the work tool is then obtained in conjunction with the respective available release time. Such programming requires a certain amount of calculating effort on the part of the programmer. In addition, large mechanical stresses can occur in the machine as a result of the release and interruption of the feeding of the workpiece which must be adapted to the highest number of strokes and the largest sheet metal thickness.

One solution to the foregoing problems has been proposed in copending U.S. patent application Ser. No. 744,883 filed on Nov. 24, 1976 for "Improved Means for Controlling the Feed Rate of a Workpiece in a Numerically Controlled Nibbling Machine." According to this solution, the foregoing disadvantages are overcome by providing means for determining the release time of the work tool in a single stroke of the work tool for any number of strokes of the tool, and means for automatically determining minimum accelerations and decelerations of the workpiece required for travelling the feed distance and for forming a desired feed rate value for the workpiece from the determined release time of the work tool and the feed distance of the workpiece per stroke.

The problem which now arises is how to stop the ram of the nibbling machine at an upper dead-center position. This can be achieved, for example, by means of an end switch placed in the path of the ram of the machine. If the nibbling machine uses different ram speeds (RPMs), the machine is first slowed down to the lowest rotational speed of the ram shaft. A stop command signal is then generated by the end switch in order to terminate movement of the ram. The disadvantage of this arrangement is that, for safety reasons, the end switch can be released only if the command signal for the lowest rotational speed of the ram shaft has already been generated and has been present for some time and it can be assumed that the ram shaft has slowed down to this lowest speed of rotation.

SUMMARY OF THE INVENTION

It is therefore an object of the present invention to provide an improved numerically controlled nibbling machine in which the ram shaft thereof is rotatable at different speeds which overcomes the aforementioned disadvantages of heretofore known numerically controlled nibbling machines and in which the ram may be brought to a stop from the lowest speed of the ram shaft at an upper dead-center position as fast as possible.

These and other objects of the invention are achieved in a numerically controlled nibbling machine in which the feed distance of the workpiece is limited by a release time during which a work tool is disengaged from the workpiece according to a predetermined number of strokes of the work tool per unit of time. The nibbling machine includes drive means for the work tool, means for controlling the feed rate of the workpiece with respect to the work tool, means for determining the release time in a single stroke of the work tool for every number of strokes of the tool per unit of time, and means for automatically determining minimum acceleration and deceleration of the workpiece required for travelling the feed distance and forming a desired feed rate value for the workpiece from the release time and the feed distance of the workpiece. The improvement comprises the means for determining the release time further comprising switch means disposed in the path of the work tool for generating a stop command signal for the drive means for the work tool. The determining means further comprises means for selectively transmitting the stop command signal from the switch means to the control means when a predetermined, lowest speed of the drive means for the work tool is reached and stopping the work tool at an upper dead-center position of the work tool in the nibbling machine. Such an arrangement permits the means for determining the release time to be utilized twice.

These and other novel features and advantages of the invention will be described in greater detail in the following detailed description.

BRIEF DESCRIPTION OF THE DRAWING

The drawing is a schematic diagram of an improved numerically controlled nibbling machine constructed according to the present invention.

DETAILED DESCRIPTION

Referring now to the drawing, there is shown a numerically controlled nibbling machine including a workpiece carriage 13 which is driven by feed motors 14 and 15 coupled to a numerical control 1 which generates command signals for the feed motors. An eccentric 6 is coupled to the ram of the nibbling machine (not shown) and is driven in the direction of arrow 9 by means of a ram drive motor 8 which is controlled by speed command signals generated by numerical control 1.

In order to determine the optimum feed rate for feed motors 14 and 15, the release time, i.e., the time during which the work tool is disengaged from the workpiece, is measured. In order to achieve this, two end switches 10 and 11 are disposed at eccentric 6 which are activated by a magnetic marker 7 disposed on eccentric 6. When marker 7 passes end switch 10, a pulse train generated by a quartz oscillator 5 is transmitted through a gate 4 to a counter 2. When marker 7 reaches end switch 11, transmission of the pulse train through gate 4 and counting of the pulses by counter 2 are interrupted. The count stored in counter 2 will then be a measure of the release time T. This value is transmitted to numerical control 1 and serves to fix the acceleration and deceleration of the ram during the release time in an optimum manner.

The measuring device also serves simultaneously to release another end switch 12 disposed adjacent the eccentric 6 which generates a stop command signal for stopping movement of the ram at an upper dead-center position OT. In order to achieve this, the lowest speed of motor 8 is selected for stopping the ram. When this speed is reached, which is ascertained by a predetermined pulse count in counter 2, end switch 12 is released, i.e., the stop command signal generated by the end switch is transmitted through a logic circuit 3 coupled to switch 12 to numerical control 1 for stopping motor 8 and, accordingly, movement of the ram of the nibbling machine.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. In a numerically controlled nibbling machine in which the feed distance of a workpiece is limited by a release time during which a work tool is disengaged from said workpiece according to a predetermined number of strokes of the work tool per unit of time, said nibbling machine including drive means for said work tool, means for controlling the feed rate of the workpiece with respect to the work tool, means for determining said release time in a single stroke of said work tool for every number of strokes of said tool per unit of time, and means for automatically determining minimum acceleration and deceleration of said workpiece required for travelling said feed distance and for forming a desired feed rate value for said workpiece from said release time and the feed distance of said workpiece, the improvement comprising said means for determining said release time further comprising switch means disposed in the path of said work tool for generating a stop command signal for said drive means for said work tool, said determining means further comprising means for selectively transmitting said stop command signal from said switch means to said control means when a predetermined, lowest speed of said drive means for said work tool is reached and stopping said work tool at an upper dead-center position of said work tool in said nibbling machine.

* * * * *